(12) United States Patent
Hartzler et al.

(10) Patent No.: US 11,831,217 B2
(45) Date of Patent: Nov. 28, 2023

(54) COOLING CRESCENT FOR E-MOTOR OF HYBRID MODULE

(71) Applicant: Schaeffler Technologies AG & Co. KG, Herzogenaurach (DE)

(72) Inventors: Kolstin Hartzler, Norton, OH (US); Matthew Payne, Glenmont, OH (US); Markus Steinberger, Sagamore Hills, OH (US); Richard Fraley, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 225 days.

(21) Appl. No.: 17/494,887

(22) Filed: Oct. 6, 2021

(65) Prior Publication Data

US 2022/0109345 A1 Apr. 7, 2022

Related U.S. Application Data

(60) Provisional application No. 63/125,392, filed on Dec. 14, 2020, provisional application No. 63/088,143, filed on Oct. 6, 2020.

(51) Int. Cl.
| | |
|---|---|
| *H02K 5/20* | (2006.01) |
| *F16H 57/04* | (2010.01) |
| *H02K 9/19* | (2006.01) |
| *H02K 7/10* | (2006.01) |

(52) U.S. Cl.
CPC .......... *H02K 5/203* (2021.01); *F16H 57/0417* (2013.01); *F16H 57/0476* (2013.01); *H02K 7/10* (2013.01); *H02K 9/19* (2013.01)

(58) Field of Classification Search
CPC . H02K 5/203; H02K 7/10; H02K 9/19; F16H 57/0417; F16H 57/0476; B60K 2006/4825
See application file for complete search history.

(56) References Cited

U.S. PATENT DOCUMENTS 10,399,427 B2   9/2019 Payne et al.

*Primary Examiner* — Tulsidas C Patel
*Assistant Examiner* — Mohammed Ahmed Qureshi

(57) ABSTRACT

A cooling crescent for a hybrid module includes a first half section and a second half section. The first half section has a radially outer inlet orifice and a plurality of circumferentially disposed radially inner outlet orifices. The second half section is sealed to the first half section to form a narrow channel hydraulically connected to the radially outer inlet orifice, and a circumferentially extending channel hydraulically connected to the narrow channel and the plurality of circumferentially disposed radially inner outlet orifices. In some example embodiments, the first half section or the second half section comprises a plurality of axially extending tabs with respective orifices for fixing the cooling crescent to a housing of the hybrid module. In an embodiment, the plurality of axially extending tabs are configured to be adjustable to vary a respective height of the tabs to accommodate for e-motor stators of varying sizes.

20 Claims, 10 Drawing Sheets

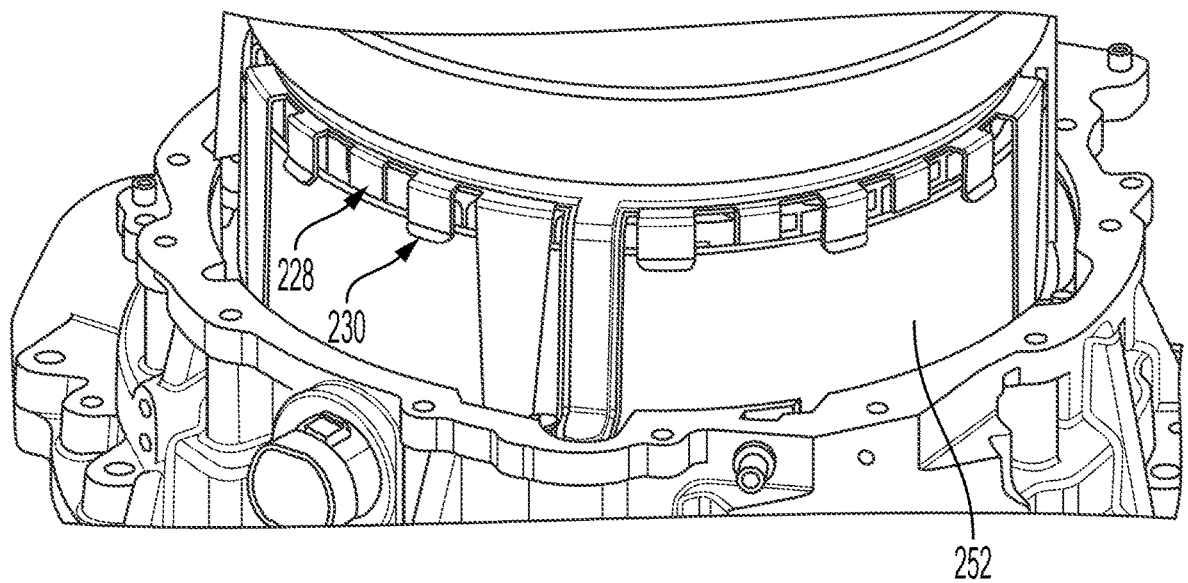
FIG. 10
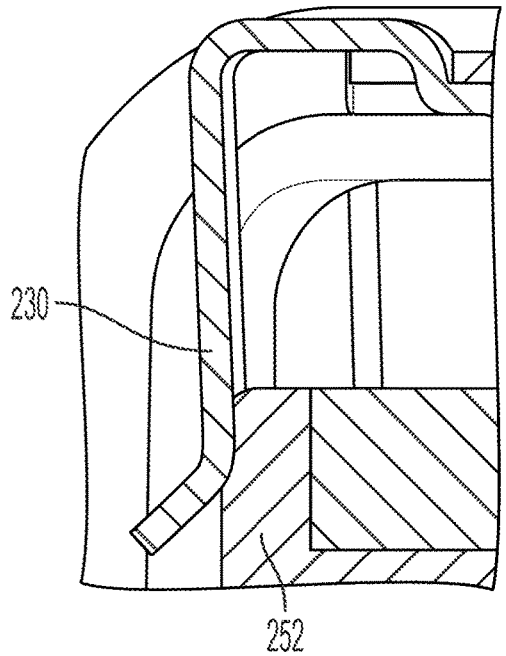 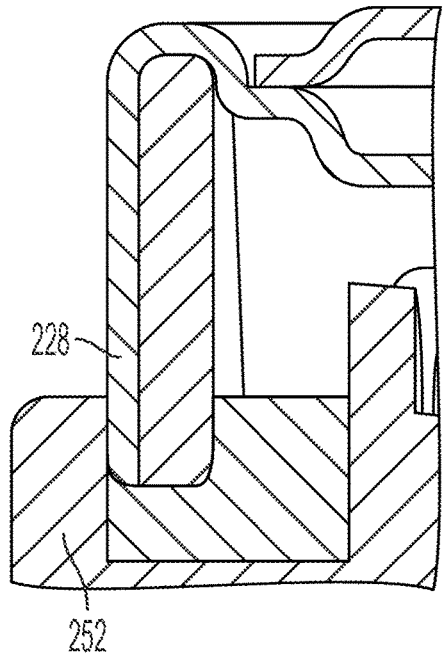
FIG. 11A  FIG. 11B

COOLING CRESCENT FOR E-MOTOR OF HYBRID MODULE

CROSS REFERENCE TO RELATED APPLICATIONS

This application claims priority to U.S. Provisional Application No. 63/088,143 filed Oct. 6, 2020 and U.S. Provisional Application No. 63/125,392 filed Dec. 14, 2020, the entire disclosures of which are hereby incorporated by reference.

TECHNICAL FIELD

The present disclosure relates generally to a hybrid module, and more specifically to a cooling crescent for an e-motor of a hybrid module.

BACKGROUND

Hybrid modules are known. One example is shown in commonly-assigned U.S. Pat. No. 10,399,427 titled HYBRID MOTOR VEHICLE DRIVE TRAIN INCLUDING HYBRID MODULE BAFFLE BLADE, hereby incorporated by reference as if set forth fully herein.

SUMMARY

Example embodiments broadly comprise a cooling crescent for a hybrid module including a first half section and a second half section. The first half section has a radially outer inlet orifice and a plurality of circumferentially disposed radially inner outlet orifices. The second half section is sealed to the first half section to form a narrow channel hydraulically connected to the radially outer inlet orifice, and a circumferentially extending channel hydraulically connected to the narrow channel and the plurality of circumferentially disposed radially inner outlet orifices. In some example embodiments, the first half section or the second half section comprises a first plurality of axially extending tabs with respective orifices for fixing the cooling crescent to a housing of the hybrid module. In an embodiment, the first plurality of axially extending tabs are configured to be adjustable to vary a respective height of the tabs to accommodate for e-motor stators of varying sizes in addition to allowing serviceability of the component in the hybrid module.

In an example embodiment, the narrow channel includes a radially extending portion and an axially extending portion connecting the radially extending portion to the circumferentially extending channel. In an example embodiment, the second half section includes an axial bulge arranged axially opposite the plurality of circumferentially disposed radially inner outlet orifices.

In example embodiments, the first half section or the second half section includes a first plurality of axially extending tabs with respective orifices for fixing the cooling crescent to a housing of the hybrid module. In an example embodiment, the first half section or the second half section includes a second plurality of axially extending tabs arranged circumferentially between the first plurality of axially extending tabs. In an example embodiment, at least one tab of the second plurality of axially extending tabs is arranged to contact an inner surface of an e-motor stator of the hybrid module and at least one tab of the second plurality of axially extending tabs is arranged to contact an outer surface of the e-motor stator. In an example embodiment, the first plurality of axially extending tabs are configured to be adjustable to vary a respective height of the tabs. In embodiments, each of the axially extending tabs includes a first segment and a second segment separate from the first segment, wherein the first segment is integral with the first half section or the second half section. The first segment may include a radial protrusion, the second segment may include a first orifice and a second orifice axially aligned, and the first segment may lock with the second segment when the radial protrusion is disposed within the first orifice or the second orifice.

In an example embodiment, the first half section and the second half section are sealed together at circumferentially opposite distal ends of the circumferentially extending channel. In an example embodiment, the first half section and the second half section are formed of sheet metal and fixed together by welding the metal together or brazing copper between the first half section and second half section.

Other example embodiments broadly comprise a hybrid module including a housing including a cooling flow port and the cooling crescent fixed to the housing and fluidically connected to the cooling flow port. In an example embodiment, the hybrid module has a gasket for sealing the cooling crescent to the housing. In another example embodiment, the hybrid module has a sealing tube for sealing the cooling crescent to the housing, wherein the sealing tube is arranged to be at least partially received within the cooling flow port.

In some example embodiments, the hybrid module has an e-motor stator fixed to the housing. At least a portion of the narrow channel is disposed radially outside of the e-motor stator, and the plurality of circumferentially disposed radially inner outlet orifices are at least partially aligned with the e-motor stator in an axial direction such that a fluid exiting the plurality of circumferentially disposed radially inner outlet orifices is directed towards the e-motor stator and in particular towards the e-motor stator windings.

In some example embodiments, the hybrid module has an e-motor stator fixed to the housing, an e-motor rotor rotatable relative to the stator, and a torque converter fixed to the rotor. The circumferentially extending channel is at least partially disposed axially between the motor stator and the torque converter. In some example embodiments, the hybrid module has a baffle fixed to the housing. The baffle extends circumferentially around a first portion of the motor stator and the cooling crescent extends circumferentially around a second portion of the motor stator, different than the first portion. In an example embodiment, the baffle is disposed on a bottom portion of hybrid module and the cooling crescent is disposed on a top portion of the hybrid module.

BRIEF DESCRIPTION OF THE DRAWINGS

FIG. 10 shows a side perspective view of the hybrid module of FIG. 8.

FIGS. 11A-11B show cross-sectional views of the hybrid module of FIG. 8.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
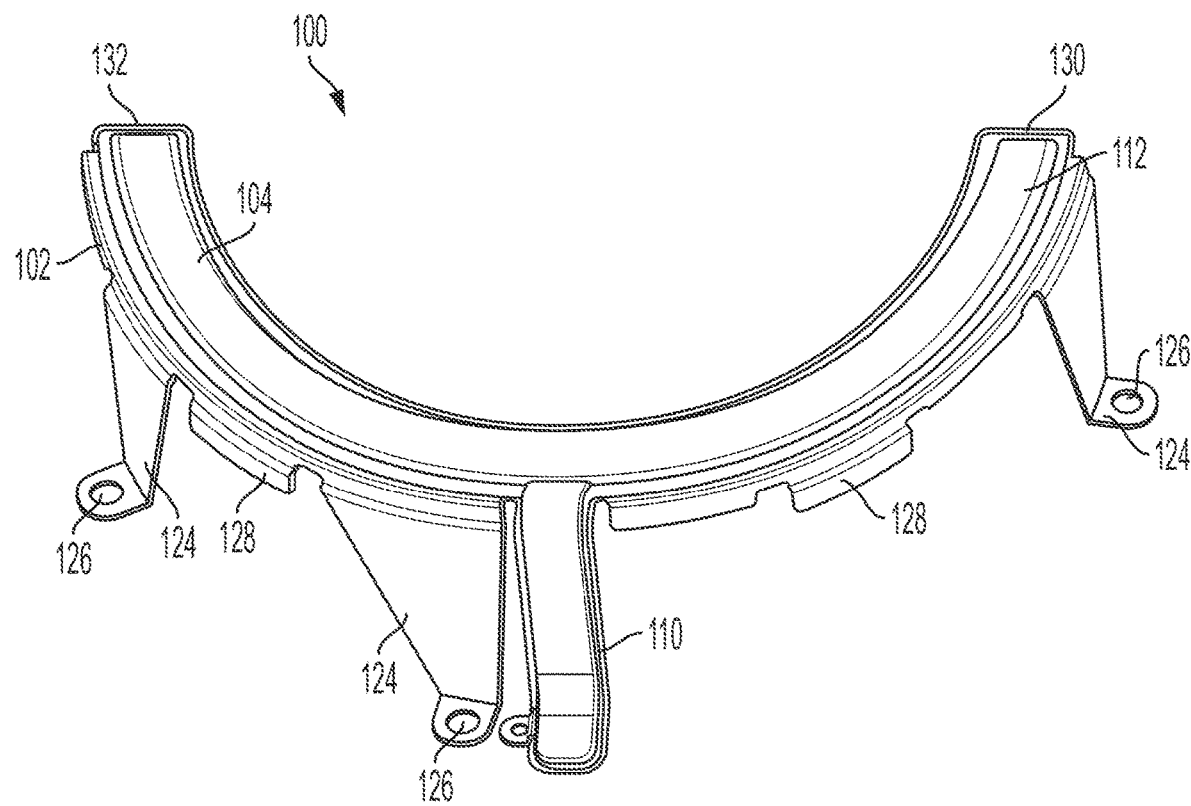
FIG. 1 shows a perspective view of a cooling crescent according to a first example embodiment of the present disclosure.
Figure 2:
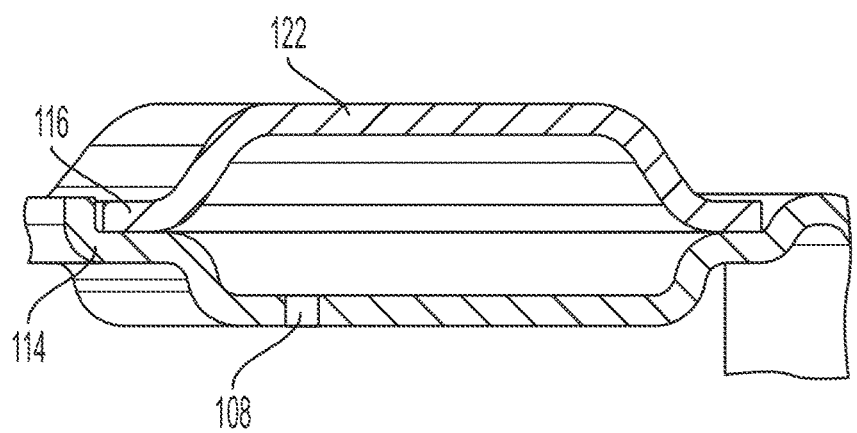
FIG. 2 shows a cross-sectional view of the cooling crescent of FIG. 1.
Figure 3:
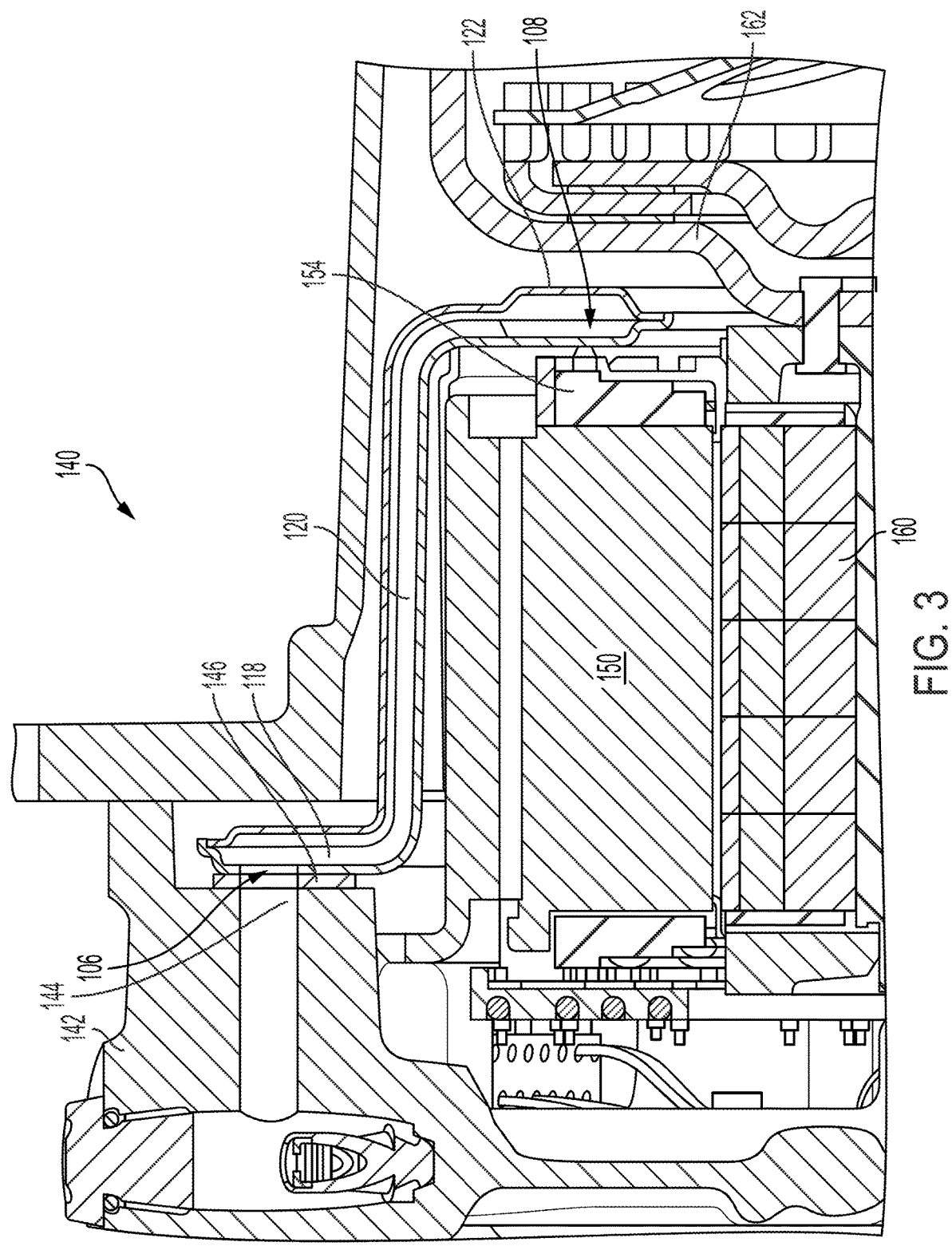
FIG. 3 shows a perspective view of a hybrid module including the cooling crescent of FIG. 1.

The following description is made with reference to FIGS. 1-5 that show a cooling crescent 100 for an e-motor of a hybrid module 140 according to a first embodiment disclosed herein. In the first embodiment, cooling crescent 100 includes half section 102 and half section 104. Half section 102 includes radially outer inlet orifice 106 (ref. FIG. 3) and circumferentially disposed radially inner outlet orifices 108. Half sections 102 and 104 are sealed together to form narrow channel 110, hydraulically connected to inlet orifice 106, and circumferentially extending channel 112 hydraulically connected to the narrow channel 110 and the outlet orifices 108. Half sections 102 and 104 include respective aligned sealing flanges 114 and 116. By aligned, we mean that the sealing flanges are arranged to face one another and sealed together with a fixing process (e.g., brazing, welding, melting, etc.) or by a sealant or other material as described below. Half sections 102 and 104 may be made of stamped sheet steel, for example, and the respective aligned sealing flanges may be fixed together by brazing.

Narrow channel 110 includes radially extending portion 118 and axially extending portion 120 connecting the radially extending portion to the circumferentially extending channel 112. Half section 104 includes axial bulge 122 arranged axially opposite radially inner outlet orifices 108. Half section 102 includes axially extending tabs 124 with respective orifices 126 for fixing the cooling crescent to a housing of the hybrid module 140 as described below. Half section 102 also includes axially extending tabs 128 arranged circumferentially between axially extending tabs 124. Although tabs 124 and 128 are shown as part of half section 102, other embodiments (i.e., tabs 124 and/or tabs 128 on half section 104) are possible. As can be seen in FIG. 1, a first one of tabs 124 is arranged on a first circumferential side of the narrow channel 110 and a second one of the tabs 124 is arranged on a second circumferential side of the narrow channel 110, opposite the first circumferential side. Half section 102 and half section 104 are sealed together at circumferentially opposite distal ends 130, 132 of circumferentially extending channel 112. Half sections 102 and 104 may be made of stamped sheet steel and sealed by brazing or welding, for example.

Hybrid module 140 includes housing 142 with cooling flow port 144, and cooling crescent 100 fixed to the housing 142 and fluidically connected to the cooling flow port 144. Hybrid module 140 may also include gasket 146 for sealing the cooling crescent 100 to the housing 142. Cooling crescent 100 may be fixed to the housing 142 by a plurality of bolts 148 threaded into the housing 142, for example.

Figure 4:
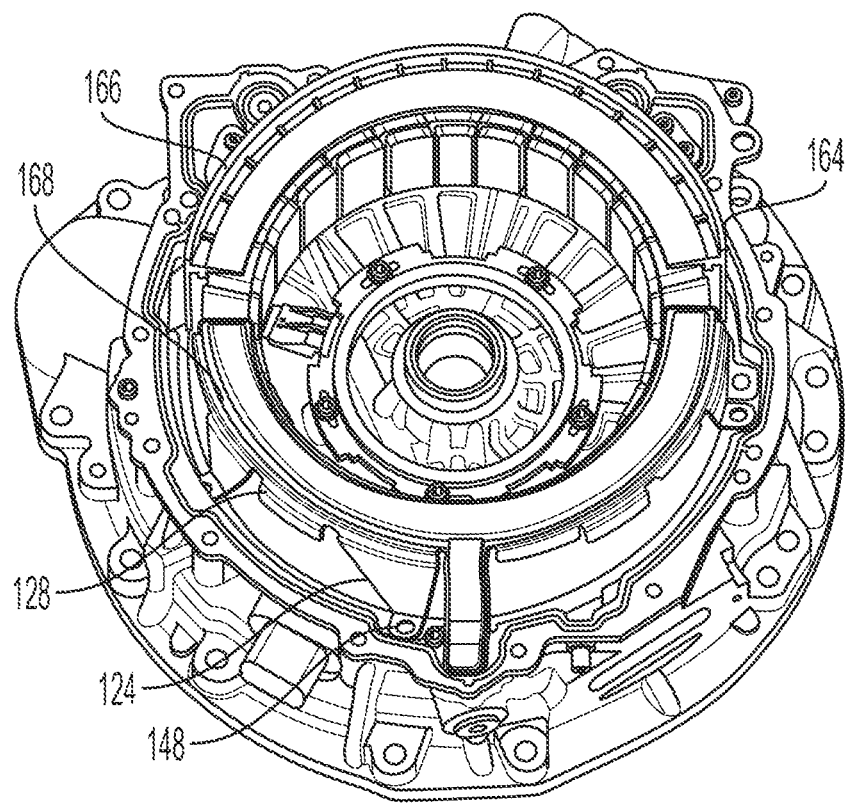
FIG. 4 shows a top perspective view of the hybrid module of FIG. 3.
Figure 5:
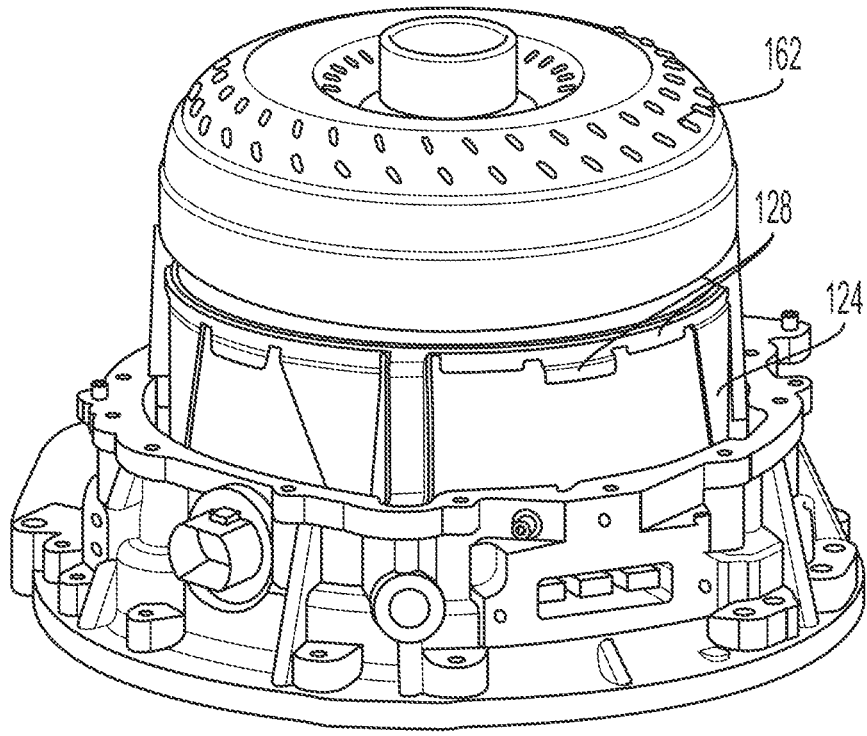
FIG. 5 shows a side perspective view of the hybrid module of FIG. 3.

Hybrid module 140 also includes e-motor stator 150 fixed to the housing 142. Axially extending portion 120 of the narrow channel 110 is disposed radially outside of the e-motor stator 150 and circumferentially disposed radially inner outlet orifices 108 are aligned with the e-motor stator 150 in an axial direction such that a fluid exiting the plurality of circumferentially disposed radially inner outlet orifices 108 is directed towards the e-motor stator 150 to provide cooling therein. As can be seen in FIGS. 4-5, some of tabs 128 extend radially under stator 150 to contact an inner diameter or surface of stator 150 and some of tabs 128 extend radially over or outside stator 150 to contact an outer diameter or surface of stator 150 to better position and support the cooling crescent 100 relative to the stator 150. E-motor stator 150 includes stator windings 154 and the circumferentially disposed radially inner outlet orifices 108 are aligned with the stator windings 154 in an axial direction such that the fluid is directed towards the stator windings 154 for direct cooling thereof.

Hybrid module 140 also includes e-motor rotor 160, rotatable relative to the e-motor stator 150, and torque converter 162 fixed to the e-motor rotor 160. Circumferentially extending channel 112 is disposed axially between the e-motor stator 150 and the torque converter 162. Hybrid module 140 also includes baffle 164 fixed to the housing 142. The baffle 164 extends circumferentially around a first portion 166 of the e-motor stator 150 and the cooling crescent 100 extends circumferentially around a second portion 168 of the e-motor stator 150, different than the first portion 166. The baffle 164 is disposed on a bottom portion of hybrid module 140 and the cooling crescent 100 is disposed on a top portion of the hybrid module 140.

Figure 6:
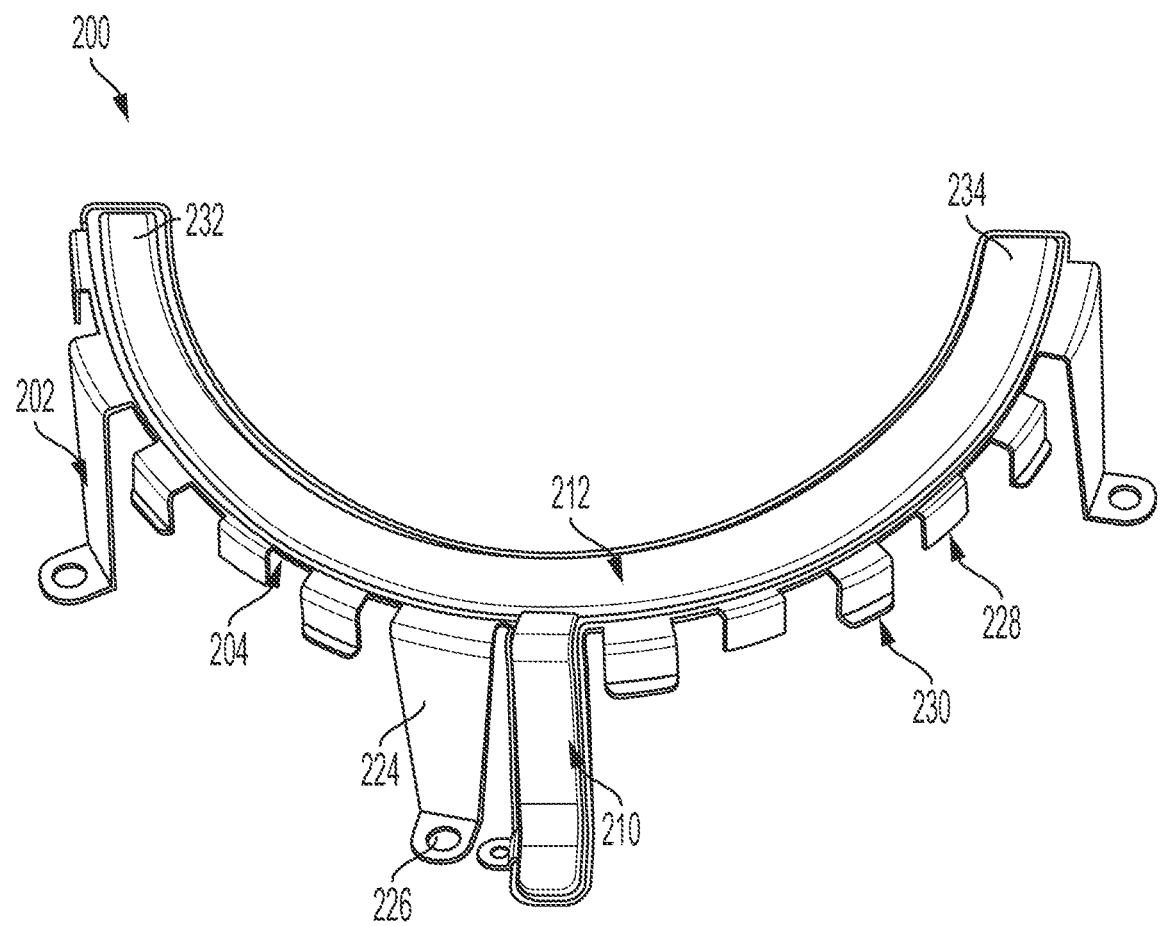
FIG. 6 shows a perspective view of a cooling crescent according to a second embodiment of the present disclosure.
Figure 7:
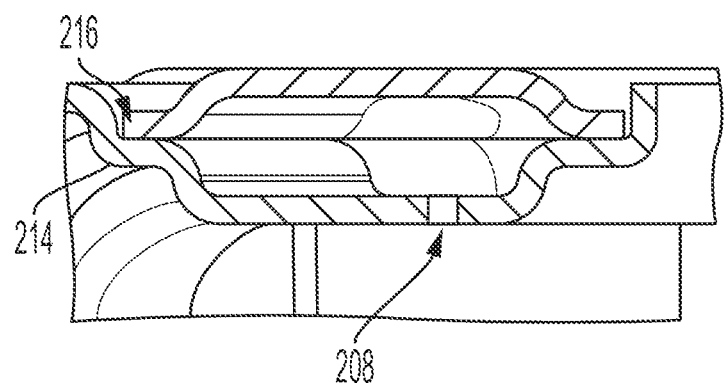
FIG. 7 shows a cross-sectional view of the cooling crescent of FIG. 6.
Figure 8:
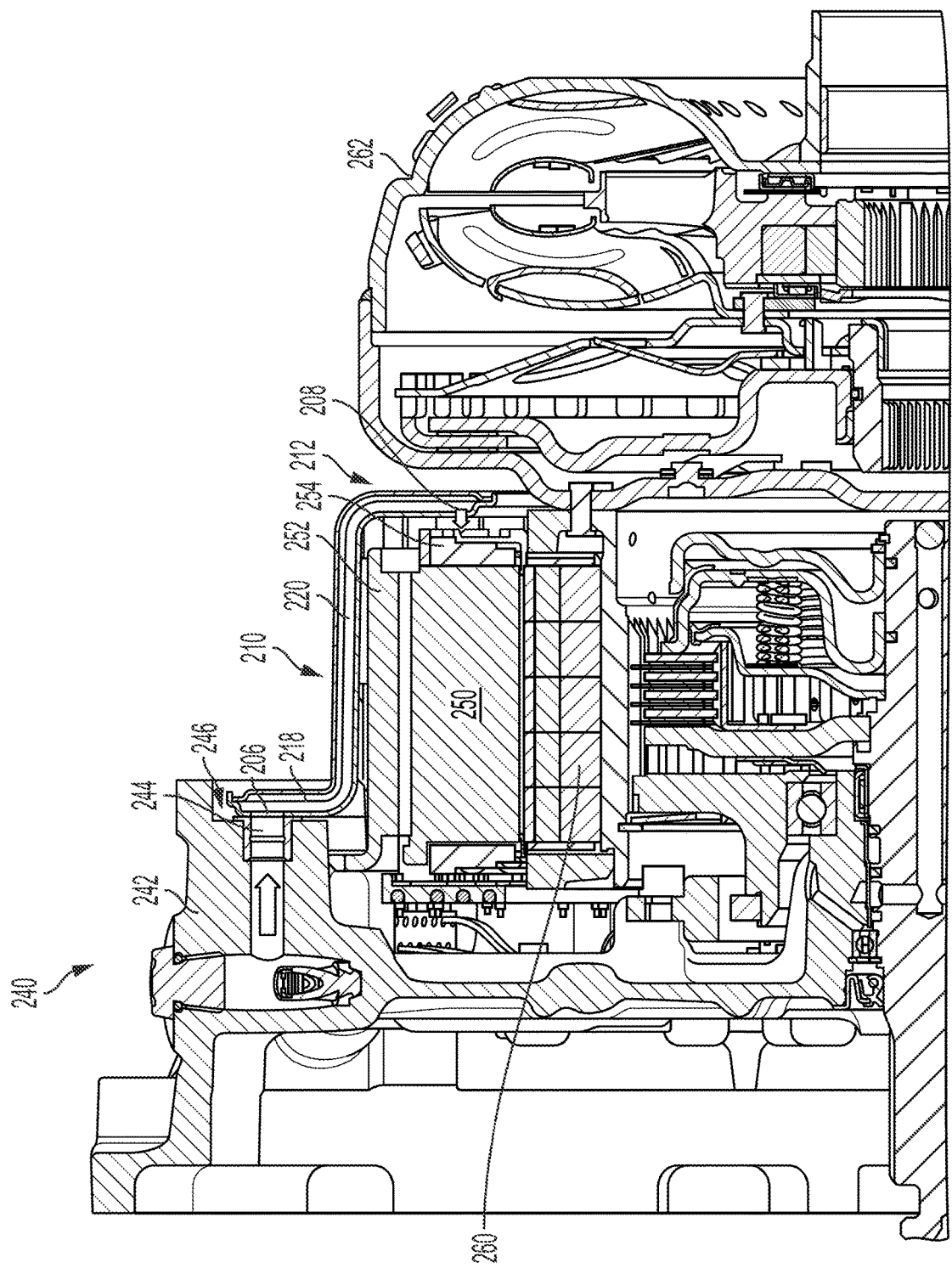
FIG. 8 shows a perspective view of a hybrid module including the cooling crescent of FIG. 6.
Figure 9:
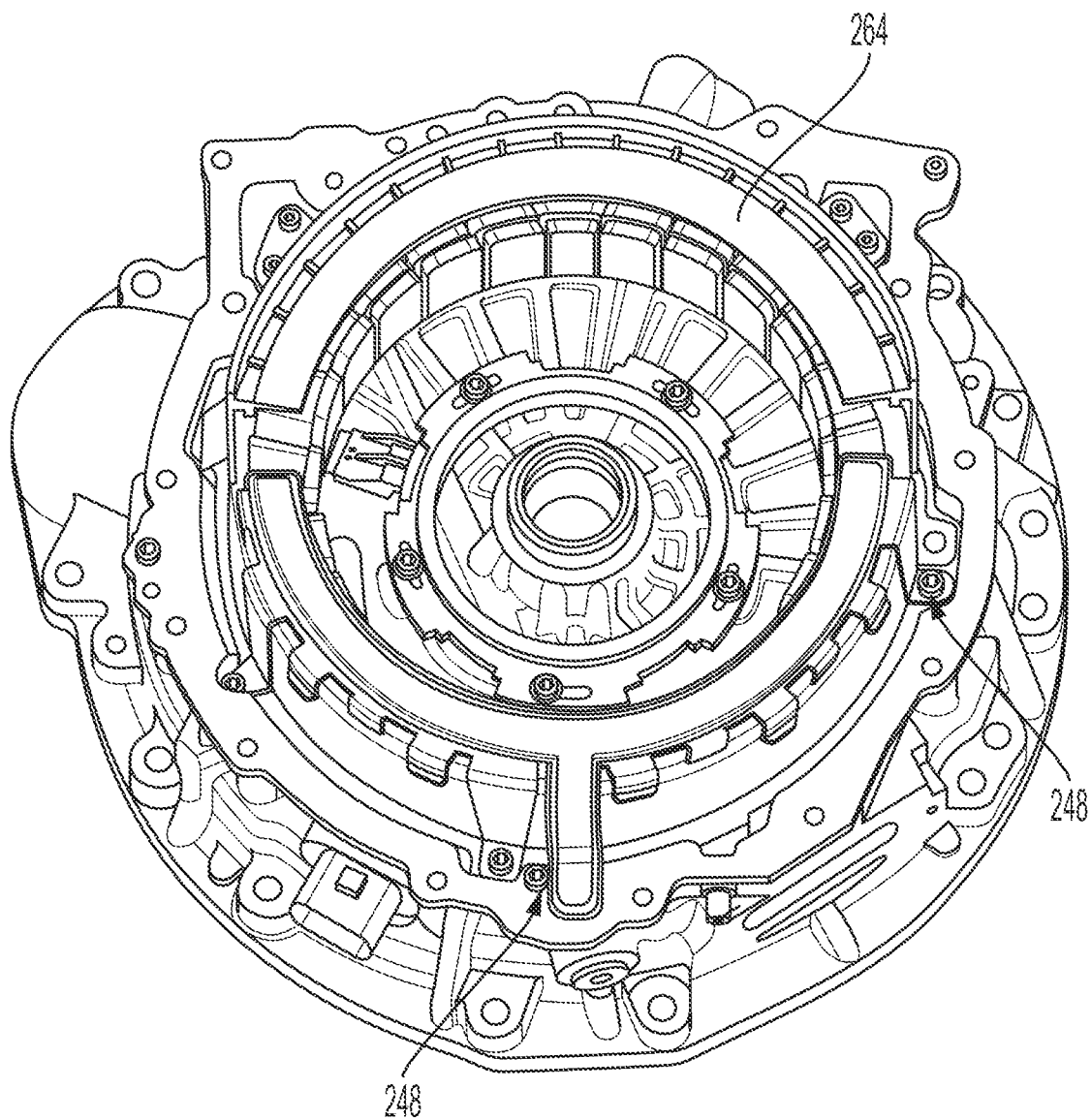
FIG. 9 shows a top perspective view of the hybrid module of FIG. 8.

The following description is made with reference to FIGS. 6-11 that show a second embodiment of a cooling crescent 200 for an e-motor of a hybrid module 240. The main difference between cooling crescent 200 and cooling crescent 100 is in the tab arrangement of half section 202 (ref. FIGS. 6-7). Similar to cooling crescent 100 (ref. FIGS. 1-2), cooling crescent 200 includes a half section 202 and a half section 204. Half section 202 includes radially outer inlet orifice 206 (ref. FIG. 8) and circumferentially disposed radially inner outlet orifices 208. Half sections 202 and 204 are sealed together to form narrow channel 210, hydraulically connected to inlet orifice 206, and circumferentially extending channel 212 hydraulically connected to narrow channel 210 and the outlet orifices 208. Half sections 202 and 204 include respective aligned sealing flanges 214 and 216. By aligned, we mean that the sealing flanges are arranged to face one another and sealed together with a fixing process (e.g., brazing, welding, melting, etc.) or by a sealant or other material. For example, half sections 202 and 204 may be made of stamped sheet steel, and the respective aligned sealing flanges may be fixed together by brazing.

Narrow channel 210 includes radially extending portion 218 and axially extending portion 220 connecting the radially extending portion to the circumferentially extending channel 212. Half section 202 includes axially extending tabs 224 with respective orifices 226 configured to fix cooling crescent 200 to a housing 242 of the hybrid module 240. Half section 202 also includes axially extending inner tabs 228 and axially extending outer tabs 230 arranged circumferentially between axially extending tabs 224. Axially extending inner tabs 228 extend and wedge against an inner diameter or surface of a stator rim 252 of the hybrid module 240 and axially extending outer tabs 230 extend along and wedge against an outer diameter or surface of the stator rim 252 to better position and support the cooling crescent 200 relative to the stator 250. Although tabs 224, 228 and 230 are shown as part of half section 202, other embodiments (i.e., tabs 224, 228 and/or tabs 230 on half section 204) are possible. Half section 202 and half section 204 are sealed together at circumferentially opposite distal ends 232, 234 of circumferentially extending channel 212. Half sections 202 and 204 may be formed of sheet metal and fixed together by means of brazing, for example.

Hybrid module 240 includes housing 242 with cooling flow port 244 and seal 246 configured to seal cooling crescent 200 to housing 242. Seal 246 may be designed as a tube seal partially received within cooling flow port 244, for example. Cooling crescent 200 is fixed to housing 242 and fluidically connected to the cooling flow port 244. The cooling crescent 200 may be fixed to the housing 242 by a plurality of bolts 248 threaded into the housing via orifices 226 of tabs 224 of half section 202, for example.

Hybrid module 240 also includes e-motor stator 250 including stator rim 252 fixed to the housing 242. Axially extending portion 220 of the narrow channel 210 is disposed radially outside of stator 250 and circumferentially disposed radially inner outlet orifices 208 are aligned with stator 250 in an axial direction such that a fluid exiting the plurality of circumferentially disposed radially inner outlet orifices 208 is directed towards stator 250. Stator 250 includes stator windings 254 and the circumferentially disposed radially inner outlet orifices 208 are aligned with the stator windings 254 in an axial direction such that the fluid is directed towards the stator windings 254 for cooling therein.

Hybrid module 240 also includes e-motor rotor 260, rotatable relative to stator 250, and torque converter 262 fixed to the e-motor rotor 260. Circumferentially extending channel 212 is disposed axially between the e-motor stator 250 and the torque converter 262. Hybrid module 240 also includes baffle 264 fixed to the housing. Baffle 264 extends circumferentially around a first portion of the stator 250 and the cooling crescent 200 extends circumferentially around a second portion of the stator 250, different than the first portion. The baffle 264 is disposed on a bottom portion of hybrid module 240 and the cooling crescent 200 is disposed on a top portion of the hybrid module 240.

Figure 12:
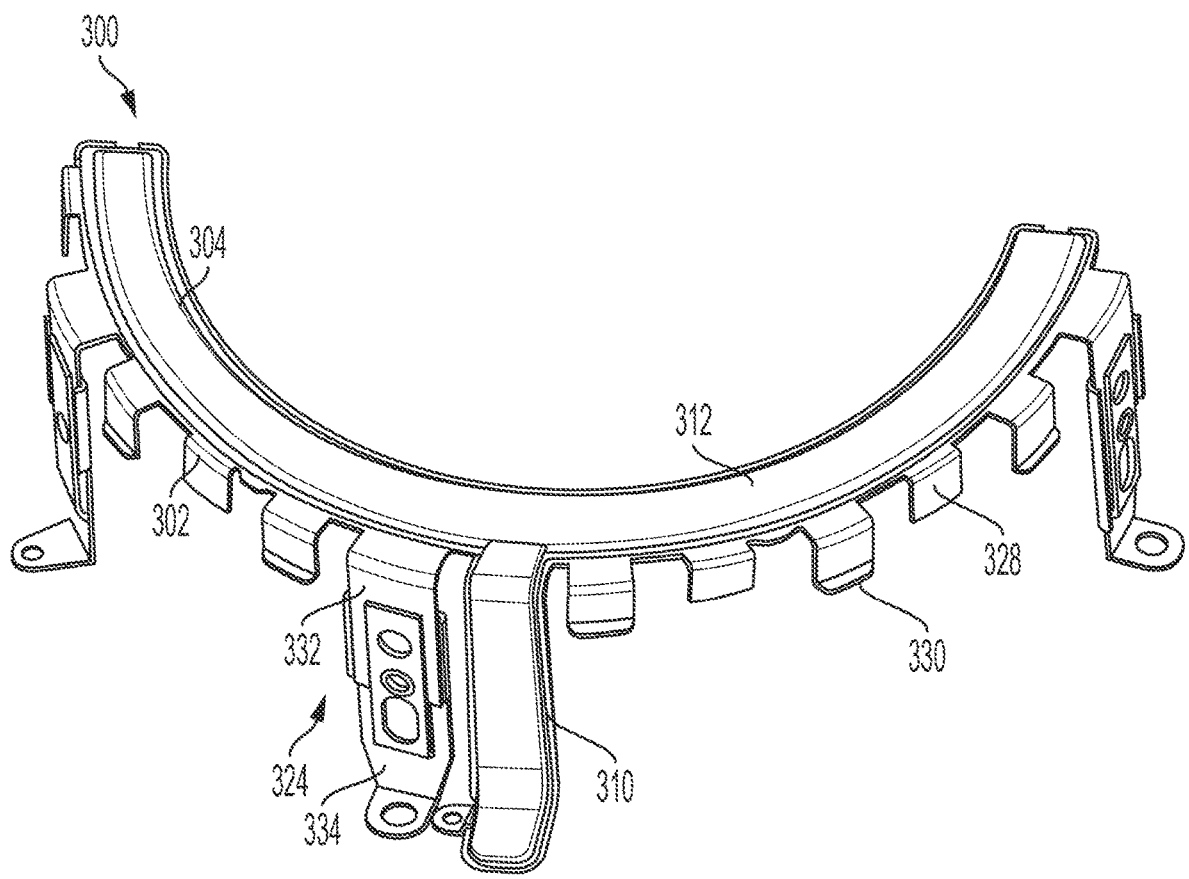
FIG. 12 shows a perspective view of a cooling crescent according to a third embodiment of the present disclosure.
Figure 13:
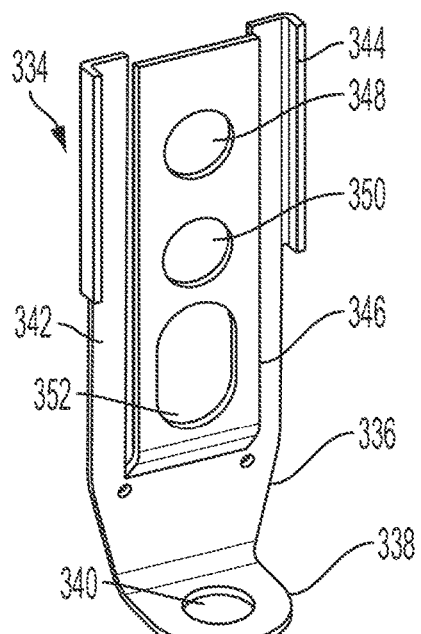
FIG. 13 shows an enlarged view of adjustable tabs of the cooling crescent of FIG. 12.
Figure 14A:
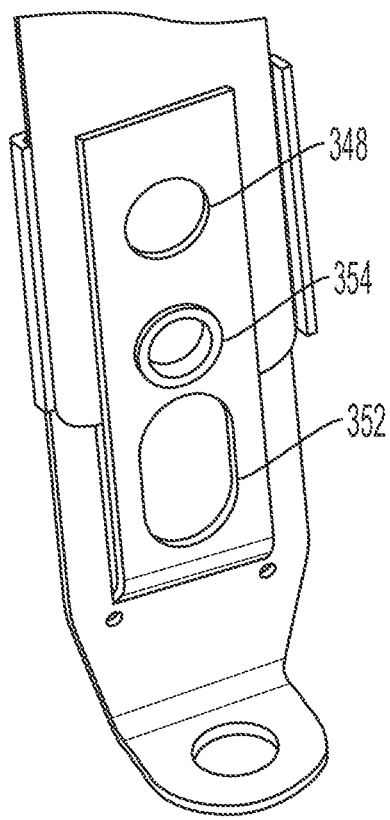
FIGS. 14A-14B show an enlarged and cross-sectional view of adjustable tabs of the cooling crescent of FIG. 12.
Figure 14B:
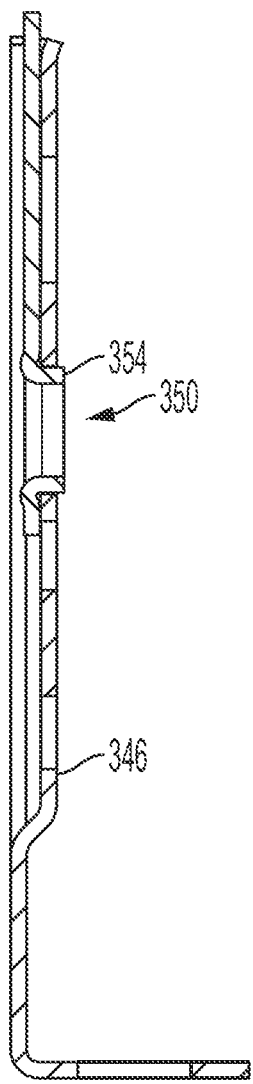

The following description is made with reference to FIGS. 12-15 that show a third embodiment of a cooling crescent 300 for an e-motor of a hybrid module. The main difference between cooling crescent 300 and cooling crescents 100, 200 is the adjustable tab arrangement of half section 302 (ref. FIGS. 12-14). Like cooling crescents 100, 200 described above, cooling crescent 300 includes half section 302 and half section 304. Half sections 302 and 304 are sealed together to form narrow channel 310 and circumferentially extending channel 312 hydraulically connected to narrow channel 310. Half section 302 includes axially extending adjustable tabs 324 configured to fix cooling crescent 300 to a housing of a hybrid module. Half section 302 also includes axially extending inner tabs 328 and axially extending outer tabs 330 arranged circumferentially between axially extending adjustable tabs 324. Axially extending inner tabs 328 extend and wedge against an inner diameter of a stator rim 362 of the hybrid module and axially extending outer tabs 330 extend along and wedge against an outer diameter of the stator rim 362 to better position and support the cooling crescent 200 relative to the stator 250. Although tabs 324, 328 and 330 are shown as part of half section 302, other embodiments (i.e., tabs 324, 328 and/or tabs 330 on half section 204) are possible.

Axially extending adjustable tab 324 includes first segment 332 and second segment 334. First segment 332 and second segment 334 are separate stamped pieces configured to allow adjustable tab 324 to be shortened or lengthened for servicing the cooling crescent 300 without removing additional hybrid module components, for example the torque converter. First segment 332 may be formed integrally with half section 302. Second segment 332 includes an axial portion 336 and a radial portion 338. Radial portion 338 includes orifice 340 configured to fix cooling crescent 300 to a housing of the hybrid module. Axial portion 336 includes axially extending flanges 342, 344 and center flange 346 extending axially between flanges 342, 344 and radially outward thereof such that a radial gap is formed therebetween. Center flange 346 includes orifice 348, orifice 350, and slot 352. Orifices 348, 350 are configured to adjust the height or axial length of adjustable tab 324 such that cooling crescent 300 may be used for e-motor stators of varying sizes.

First segment 332 further includes radial protrusion 354 and is configured to be received within the radial gap between flanges 342, 344 and center flange 346 of second segment 334. When assembled, radial protrusion 354 is disposed within orifice 348 or 350 to lock first segment 332 with second segment 334. Radial protrusion 354 may be disposed within orifice 348 to extend adjustable tab 324 to a first height and may be disposed within orifice 350 to extend adjustable tab 324 to a second height that is less than the first height. Slot 352 is configured to allow adjustable tab 324 to be raised for serviceability.

Figure 15A:
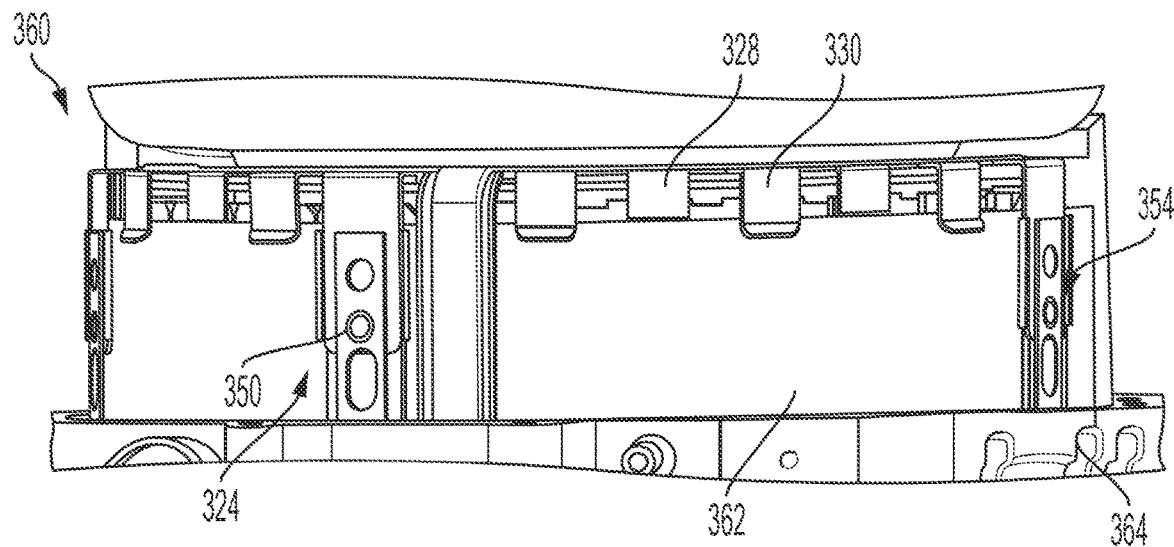
FIGS. 15A-15B show side views of a stator assembly of a hybrid module including the cooling crescent of FIG. 12 in an installed position and a serviceable position.
Figure 15B:
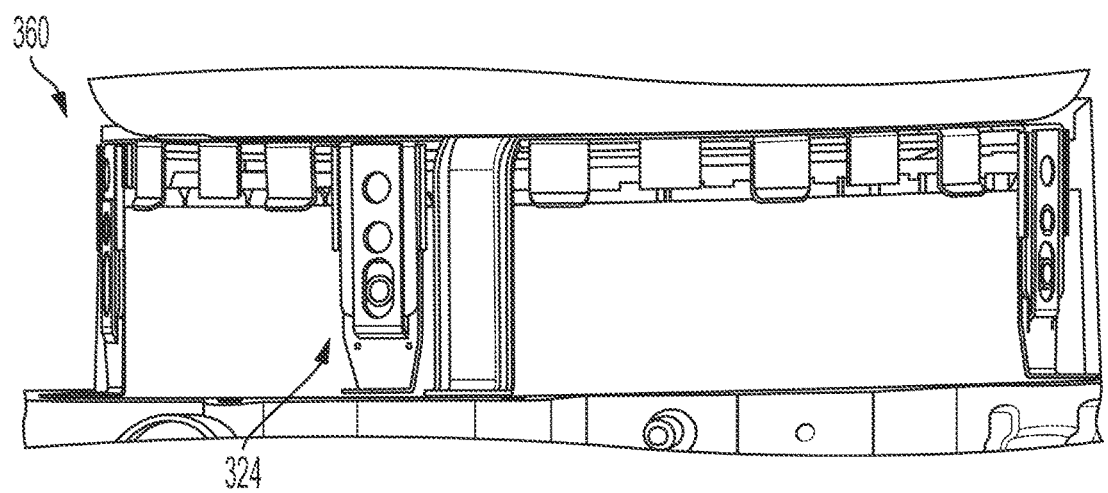

Stator assembly 360 (ref. FIGS. 15A-15B) includes stator rim 362 and cooling crescent 300 fixed to housing 364 of the hybrid module. As shown in FIG. 15A, adjustable tab 324 is in an installed state or position. That is, first segment 332 is locked with second segment 334 via radial protrusion 354 being disposed within orifice 350. As shown in FIG. 15B, adjustable tab 324 is in a serviceable state or position. That is, radial protrusion 354 of first segment 332 is disposed within slot 352 such that adjustable tab 324 can be raised.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Cooling crescent
102 Half section (first)
104 Half section (second)
106 Radially outer inlet orifice
108 Circumferentially disposed radially inner orifices
110 Narrow channel
112 Circumferentially extending channel
114 Sealing flange (first half section)
116 Sealing flange (second half section)
118 Radially extending portion (narrow channel)
120 Axially extending portion (narrow channel)
122 Axial bulge (second half section)
124 Axially extending tabs
126 Orifices
128 Axially extending tabs
130 Distal end (circumferentially extending channel)
132 Distal end (circumferentially extending channel)
140 Hybrid module
142 Housing
144 Cooling flow port
146 Gasket
148 Bolts
150 E-motor stator
154 Stator windings
160 E-motor rotor
162 Torque converter
164 Baffle
166 First portion (E-motor Stator)
168 Second portion (E-motor Stator)
200 Cooling crescent
202 Half section (first)
204 Half section (second)
206 Radially outer inlet orifice
208 Radially inner outlet orifices
210 Narrow channel
212 Circumferentially extending channel
214 Sealing flange
216 Sealing flange
218 Radially extending portion (narrow channel)
220 Axially extending portion (narrow channel)
224 Tabs
226 Orifices
228 Inner tabs
230 Outer tabs
232 Distal ends
234 Distal ends
240 Hybrid module
242 Housing
244 Cooling flow port
246 Seal
248 Bolts
250 E-motor stator
252 Stator rim
254 Stator windings
260 E-motor rotor
262 Torque converter
264 Baffle
300 Cooling crescent
302 Half section (first)
304 Half section (second)
310 Narrow channel
312 Circumferentially extending channel
324 Adjustable tab
328 Inner tabs
330 Outer tabs
332 First segment
334 Second segment
336 Axial portion (second segment)
338 Radial portion (second segment)
340 Orifice
342 Axially extending flanges
344 Axially extending flanges
346 Center flange
348 Orifice (center flange)
350 Orifice (center flange)
352 Slot (center flange)
354 Radial protrusion
360 Stator assembly
362 Stator rim
364 Housing

What is claimed is:

1. A cooling crescent for a hybrid module, comprising:
a first half section comprising:
  a radially outer inlet orifice; and
  a plurality of circumferentially disposed radially inner outlet orifices; and
a second half section, sealed to the first half section to form:
  a narrow channel hydraulically connected to the radially outer inlet orifice; and
  a circumferentially extending channel hydraulically connected to:
    the narrow channel; and
    the plurality of circumferentially disposed radially inner outlet orifices.

2. The cooling crescent of claim 1, wherein the narrow channel comprises:
a radially extending portion; and
an axially extending portion connecting the radially extending portion to the circumferentially extending channel.

3. The cooling crescent of claim 1, wherein the second half section comprises an axial bulge arranged axially opposite the plurality of circumferentially disposed radially inner outlet orifices.

4. The cooling crescent of claim 1, wherein the first half section or the second half section comprises a first plurality of axially extending tabs with respective orifices for fixing the cooling crescent to a housing of the hybrid module.

5. The cooling crescent of claim 4, wherein the first half section or the second half section comprises a second plurality of axially extending tabs arranged circumferentially between the first plurality of axially extending tabs.

6. The cooling crescent of claim 5, wherein at least one tab of the second plurality of axially extending tabs is arranged to contact an inner surface of an e-motor stator of the hybrid module and at least one tab of the second plurality of axially extending tabs is arranged to contact an outer surface of the e-motor stator.

7. The cooling crescent of claim 4, wherein the first plurality of axially extending tabs are configured to be adjustable to vary a respective height of the tabs.

8. The cooling crescent of claim 7, wherein each of the axially extending tabs includes a first segment and a second segment separate from the first segment.

9. The cooling crescent of claim 8, wherein the first segment is integral with the first half section or the second half section.

10. The cooling crescent of claim 8, wherein:
the first segment includes a radial protrusion;
the second segment includes a first orifice and a second orifice axially aligned; and
the first segment is locked with the second segment when the radial protrusion is disposed within the first orifice or the second orifice.

11. The cooling crescent of claim 1, wherein the first half section and the second half section are sealed together at circumferentially opposite distal ends of the circumferentially extending channel.

12. A hybrid module comprising:
a housing including a cooling flow port; and
a cooling crescent fixed to the housing and fluidically connected to the cooling flow port, the cooling crescent comprising:
a first half section including a radially outer inlet orifice and a plurality of circumferentially disposed radially inner outlet orifices; and
a second half section sealed to the first half section to form a narrow channel hydraulically connected to the radially outer inlet orifice and a circumferentially extending channel hydraulically connected to the narrow channel and the plurality of circumferentially disposed radially inner outlet orifices.

13. The hybrid module of claim 12, further comprising a gasket for sealing the cooling crescent to the housing.

14. The hybrid module of claim 12, further comprising a sealing tube for sealing the cooling crescent to the housing, wherein the sealing tube is arranged to be at least partially received within the cooling flow port.

15. The hybrid module of claim 12, wherein the first half section or the second half section comprises a plurality of axially extending tabs configured to be adjustable to vary a respective height of the tabs, the axially extending tabs being configured to fix the cooling crescent to a housing of the hybrid module.

16. The hybrid module of claim 12, further comprising an e-motor stator fixed to the housing, wherein:
at least a portion of the narrow channel is disposed radially outside of the e-motor stator; and
the plurality of circumferentially disposed radially inner outlet orifices are at least partially aligned with the e-motor stator in an axial direction such that a fluid exiting the plurality of circumferentially disposed radially inner outlet orifices is directed towards the e-motor stator.

17. The hybrid module of claim 16, wherein:
the e-motor stator comprises a plurality of stator windings; and
the plurality of circumferentially disposed radially inner outlet orifices are aligned with the stator windings in the axial direction such that the fluid is directed towards the stator windings.

18. The hybrid module of claim 12, further comprising:
an e-motor stator fixed to the housing;
an e-motor rotor rotatable relative to the e-motor stator; and
a torque converter fixed to the e-motor rotor, wherein the circumferentially extending channel is at least partially disposed axially between the e-motor stator and the torque converter.

19. The hybrid module of claim 18, further comprising a baffle fixed to the housing, wherein:
the baffle extends circumferentially around a first portion of the e-motor stator; and
the cooling crescent extends circumferentially around a second portion of the e-motor stator, different than the first portion.

20. The hybrid module of claim 19, wherein:
the baffle is disposed on a bottom portion of hybrid module; and
the cooling crescent is disposed on a top portion of the hybrid module.

* * * * *